J. S. King,

Making Cut Nails,

No. 787. Reissued Aug. 2, 1859.

Witnesses;
Z. C. Robbins
Edw. F. Brown

Inventor;
Jahaziah S. King

N. PETERS, PHOTO-LITHOGRA JN., D. C.

UNITED STATES PATENT OFFICE.

JAHAZIAH S. KING, OF RAYNHAM, MASSACHUSETTS.

IMPROVED NAIL-MAKING MACHINE.

Specification forming part of Letters Patent No. 18,457, dated October 20, 1857; Reissue No. 787, dated August 2, 1859.

*To all whom it may concern:*

Be it known that I, JAHAZIAH S. KING, of Raynham, in the county of Bristol and State of Massachusetts, have invented a new and improved method of producing from a nail-plate a nail whose shape nearly corresponds with that of a wrought or hammered nail; and I do hereby declare that the following is a full and exact description thereof, reference being had to the accompanying drawings, making a part of this specification.

Figure 1:
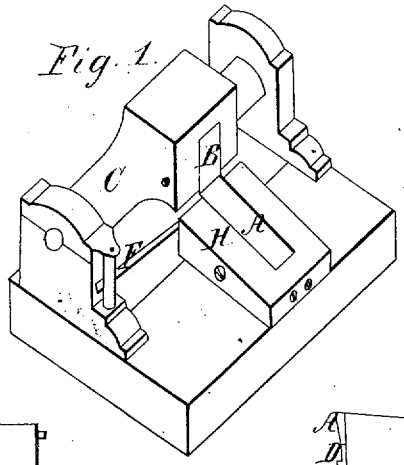
Figure 2:
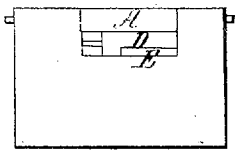
Figure 3:
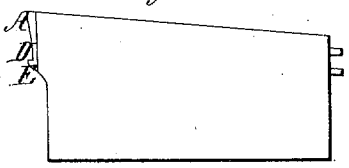
Figure 4:
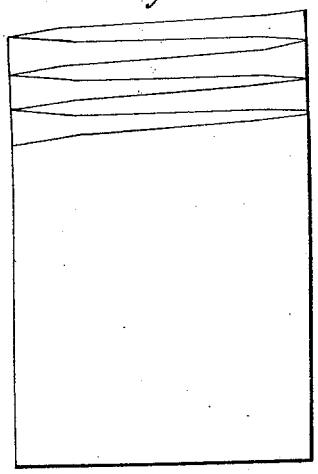
Figure 5:
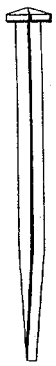
Figure 6:
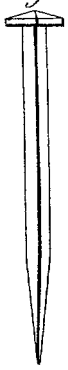

Figure 1 is a perspective view of a portion of the nail making machine in which I automatically produce the above-mentioned nail; Fig. 2, an end view of that portion of said machine which contains the heading-die, the bed-piece, and the bed knife; and Fig. 3 is a side view of the same. Fig. 4 is a plan of a portion of a nail plate upon which are lines that represent the form of one side of a nail as it is first cut from said plate, and also the form of the edges of the knives. Fig. 5 is a view of a nail after it has been cut off and headed, and Fig. 6 is a view of the same nail after its flat point has been pressed into the shape of a sharp point before leaving the nail-making machine.

In Fig. 1, A marks the bed-knife, B the moving knife, C the cutting jaw, F the nipper, and H the bed-piece. In Fig. 2, D is the bed or back piece, A the bed-knife, and E the lip or projection of the back-piece against which the edge of the flat point of the nail is pressed into the shape represented in Fig. 6.

My invention consists in so producing cut-nails that each nail will be seized the instant after it is cut from the nail-plate, and be compressively operated upon at the point thereof in such a manner as to bring the flat point of said nail to an equal-sided sharp point, or to a point which nearly resembles that of a wrought nail.

The requisite compressing force may be exerted upon the edges of the flat points of nails, as they are first cut from the nail-plate, by locating the shoulder or lip E in such a position that the outer end of the moving cutter will act in connection with said lip in such a manner as to bring each nail to an equal-sided sharp point immediately after it has been severed from the nail-plate; but I do not intend to limit myself to the precise manner of changing the flat point of a cut nail to an equal-sided sharp point, provided the said operation be performed by compression within the same machine in which the said nail is cut from the nail-plate and immediately after the said cutting operation.

This, my improved manner of pointing a cut-nail enables the knives of the machine to be so shaped as to leave more stock in the nail near the point of the same than is ordinarily done, by which I am enabled to give to said nail a shape that almost precisely resembles that of a wrought or a hammered nail.

What I claim as my invention, and desire to secure by Letters Patent, is—

Making cut nails in such a manner that each nail will be seized the instant after it is cut from the nail-plate, and be compressively operated upon at the point thereof, in the manner as herein specified, to bring the flat point of said nail to an equal-sided sharp point, or to substantially the same character of point that is ordinarily given to wrought nails.

The above specification of my improved method of making sharp-pointed nails by the combined operations of cutting and pressing, signed this 26th day of May, 1859.

JAHAZIAH S. KING.

Witnesses:
Z. C. ROBBINS,
EDM. F. BROWN.